United States Patent
Century et al.

[11] 3,775,998
[45] Dec. 4, 1973

[54] SAFETY CLUTCH

[75] Inventors: Bernard A. Century, Cleveland Heights; Michael Linsay, South Euclid, both of Ohio

[73] Assignee: Allied Steel & Tractor Products, Incorporated, Cleveland, Ohio

[22] Filed: Apr. 14, 1972

[21] Appl. No.: 244,023

[52] U.S. Cl................. 64/30 D, 64/30 C, 64/13
[51] Int. Cl................................... F16d 7/02
[58] Field of Search............. 64/30 C, 30 D, 30 R, 64/23, 1 B, 11

[56] References Cited
UNITED STATES PATENTS

| | | | |
|---|---|---|---|
| 3,118,292 | 1/1964 | Schroter et al. | 64/30 C |
| 2,561,830 | 7/1951 | Venderzec | 64/30 D |
| 2,801,535 | 8/1957 | Cockery | 64/30 R |
| 3,100,974 | 8/1963 | Wilson et al. | 64/30 C |

FOREIGN PATENTS OR APPLICATIONS 774,720   5/1957   Great Britain ..................... 64/30 C

*Primary Examiner*—Charles J. Myhre
*Assistant Examiner*—Randall Heald
*Attorney*—Charles G. Lyon et al.

[57] ABSTRACT

A safety clutch to be used in conjunction with a horizontal earth boring machine. The clutch is located between the boring machine and the auger. The clutch acts as a safety device to prevent over-turning of the boring machine when the auger becomes bound in the earth, prevents stalling of the drive unit, and limits the loadings on the power-train elements and the auger. The safety clutch comprises a drive plate compressed between friction disks having resilient backing elements. These friction disks and backing elements are fixed to the driven side of the clutch.

17 Claims, 5 Drawing Figures

SAFETY CLUTCH

BACKGROUND OF THE INVENTION

This invention relates to a safety clutch for a horizontal earth boring machine which is capable of absorbing shock loading and minor misalignments without impairing the safety features of performance of the clutch.

A horizontal earth boring machine typically comprises a housing, guide rails, a means for advancing the housing along the guide rails, and an auger which is fitted to the forward end of the housing. The housing typically contains a motor for driving the auger and means for powering the advancing mechanism. A necessary element of these machines is a clutch operably connecting the power train elements to the auger. These clutches are needed to prevent the over-turning of the earth boring unit when the auger becomes bound in the earth. Where the boring unit is sufficiently anchored to prevent the over-turning of the housing, the clutch is needed to prevent the motor from stalling.

The clutches heretofore employed for horizontal earth boring machines have typically used a driven plate which is clamped between phenolic disks. The phenolic disks are held in compression against the driven plate by rigid plates attached to the power train. These phenolic disks, the rigid supporting outer plates and the driven plate as heretofor employed have been incapable of absorbing quantities of energy necessary to dissipate transient thrust-type shock overloads transmitted from the auger assembly. Consequently, the excessive shock loadings are transmitted through the clutch assembly to the power-train elements and the driving motor. This high shock transmission characteristic can result in the premature failure of the power train and motor elements.

In addition, to thrust-type shock overloads experienced by the clutch, excessive side loadings and torques transmitted from the auger are also received. These loadings tend to create misalignment between the driving and driven portions of the clutch unit. The clutches heretofore employed with horizontal earth boring equipment are less able to accomodate misalignment because of the rigid nature of these devices. Undue strain on the clutch components can result from misalignment as well as a substantial change in the torque value at which the clutch will commense to slip.

SUMMARY OF THE INVENTION

An object of the present invention is to provide a clutch which can reduce the effect of transient thrust-type shock overloads transmitted from the auger string to the power train elements. To accomplish this result, the present invention incorporates a novel combination of elements which reduces the rigidity of the unit while enhancing its overall performance. In the clutch of the present invention, the phenolic disks are backed with a resilient material. This resilient material is capable of absorbing substantial quantities of energy transmitted from the auger string. In this way, shock overloads are not transmitted through the clutch to the power train elements. To accomodate this resilient material which is not capable of performing the actual clutching operation, the phenolic disks have been constrained to rotate with the backing plates. In this way, frictional loads are not placed on the resilient elements.

Another object of the present invention is to accommodate the misalignments imposed by torques and side loadings transmitted from the auger string. Because the resilient elements associated with the friction disks increase the total elasticity of the unit, smaller internal loads result from a given misalignment than would be experienced in the more rigid units heretofore employed. Further, the resilient elements more evenly distribute the normal pressure between the drive plate and the friction disks under such misalignments. Consequently, misalignment problems are less likely to result in component failure and substantial deviations in the torque levels at which the clutch will commence to slip.

A third object of the present invention is to extend the fatigure life of the clutch components. The resilient nature of the backing for the friction disks acts to absorb and dissipate shock energy. Because this shock energy is not transmitted through rigid couplings to the clutch components, the components are not subjected to forces of high instaneous magnitude which are detrimental to the fatigue life of the components. Consequently, the resilient backing material enhances the life of the clutch as well as it performance. A fourth object of the present invention is to provide a less sensitive means for adjusting the clutch to proper pressure. The present invention employs the same mechanisms for clutch pressure adjustment. However, because of its elasticity, the introduction of the resilient backing material provides for a buildup of compressive force across a larger displacement of the adjustment means. As a result, each specific adjustment of the clutch pressure will require a greater change in the adjusting means. This results in a greater range of misadjustment available to the operator without causing significant over-pressure on the clutch.

Other and further objects and advantages of the present invention will be made readily apparent from the following detailed description and accompanying drawings.

DESCRIPTION OF THE PREFERRED EMBODIMENTS

Figure 1:
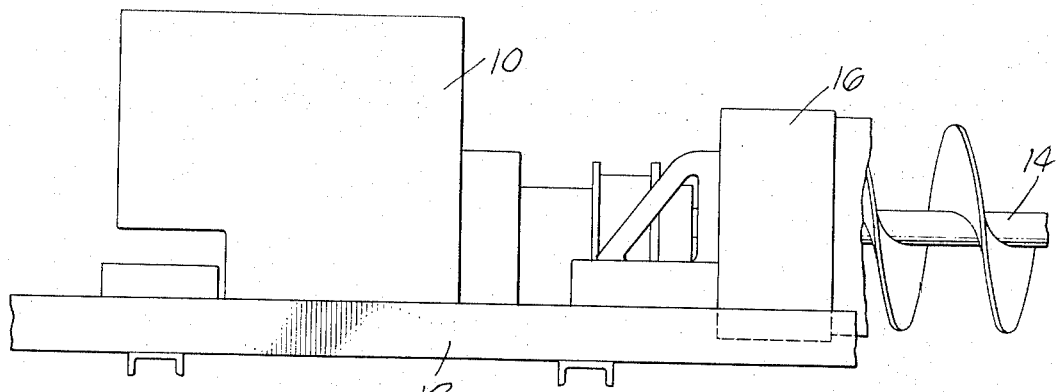
FIG. 1 is a side view of the horizontal earth boring machine.
Figure 2:
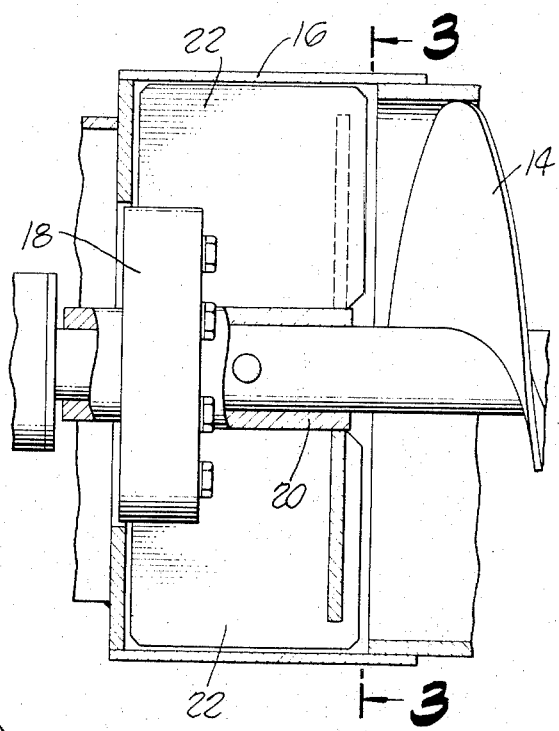
FIG. 2 is a side view of the clutch housing shown in place with the housing of the horizontal earth boring machine in section.

Turning now to the drawings, the horizontal earth boring machine 10 is shown on rails 12 with a portion of the auger 14 illustrated in place. A cover 16 surrounds the clutch assembly 18 and the output coupling 20. Plates 22 rotate with the drive mechanism to force dirt through openings (not shown) provided in the cover 16.

Figure 3:
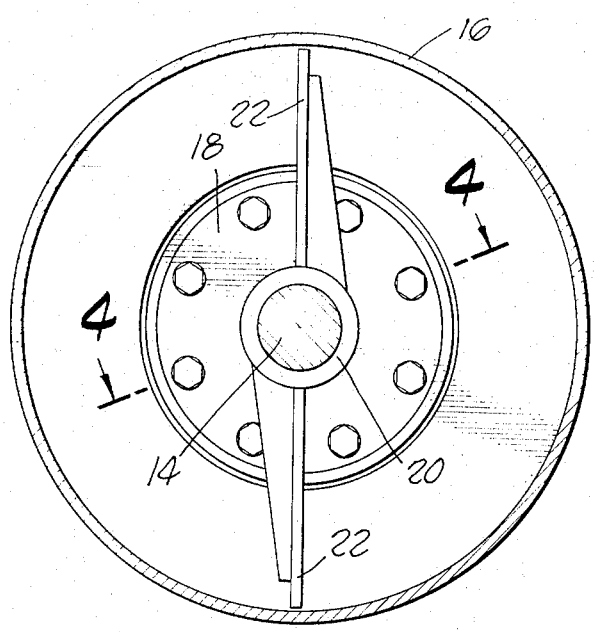
FIG. 3 is a cross-sectional view taken along line 3—3 of FIG. 2 illustrating a front view of the clutch housing.
Figure 4:
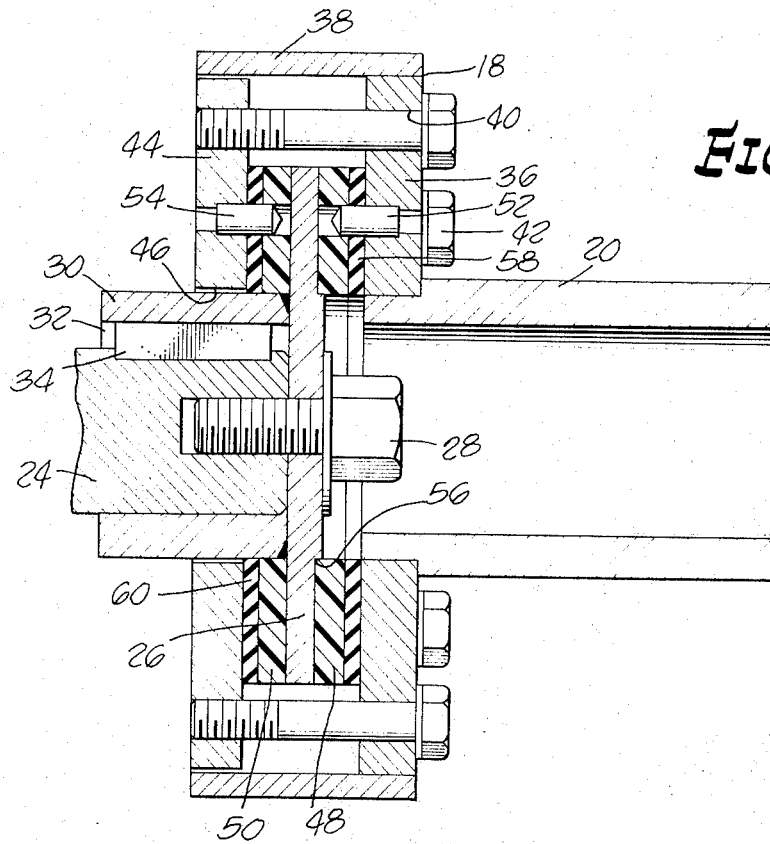
FIG. 4 is a cross-sectional view taken along line 4—4 of FIG. 3.

Turning specifically to FIG. 4, input shaft 24 is rigidly fixed to the circular clutch plate 26 by bolt 28 and collar 30. Collar 30 is welded to the clutch plate 26. Keyway 32 is provided in collar 30 for key 34. Key 34 prevents relative rotation between the collar 30 and the input shaft 24. The clutch housing 18 is rigidly fixed to the output coupling 20 and rotates therewith. The clutch housing is comprised of a circular front plate 36 and an annular cover 38. The annular cover 38 acts to promote alignment between the input and output portions of the clutch. When other means of insuring alignment are provided as in FIG. 5, the annular cover 38 becomes unnecessary. Holes 40 are drilled into the front plate 36 to accommodate the load bolts 42. Eight bolts 42 are illustrated in FIG. 3. However, the number of load bolts 42 required may vary and is dependent upon load requirements and convenience. It is beneficial to have the load bolts 42 equally spaced about the front plate 36 in order to provide uniform loading on the clutch. The bolts 42 are threaded into a back plate 44. The back plate 44 is circular and fits within the annular cover 38. The back plate 44 has a hole 46 centrally located therein to accommodate the input shaft 24 and the collar 30. When the annular cover 38 is employed with the back plate 44, the combination acts to maintain alignment between the input and output portions of the clutch. Hole 46 acts as a guide about collar 30 to keep collar 30 and consequently clutch plate 26 concentric with the clutch. Clamped between the front plate 36 and the back plate 44 and are phenolic disks 48 and 50. The phenolic disks 48 and 50 are restrained from rotational movement relative to the front plate 36 by dowels 52 and 54 respectively. A plurality of these dowels 52 and 54 may be provided where necessary. The phenolic disk 48 and 50 are forced into contact with the clutch plate 26 by tightening the bolts 42. Frictional interfaces are thereby created for the clutching operation. A raised circular portion 56 is provided on the circular clutch plate 26 to retain the phenolic friction disk 48 in alignment. The input shaft 24 provides the alignment function for the phenolic friction disk 50. A resilient disk 58 is positioned between the front plate 36 and the phenolic friction disk 48. A similar resilient disk 60 is positioned between the back plate 44 and the phenolic friction disk 50. These resilient disks 58 and 60 act to absorb thrust shock energy imparted to the clutch and accomodate angular misalignments between the input and output portions of the clutch. A wide range of resilient materials may be used for the disks 58 and 60. However, it has been found that Neoprene having a Shore hardness of from 50 to 60 provides the best results.

Figure 5:
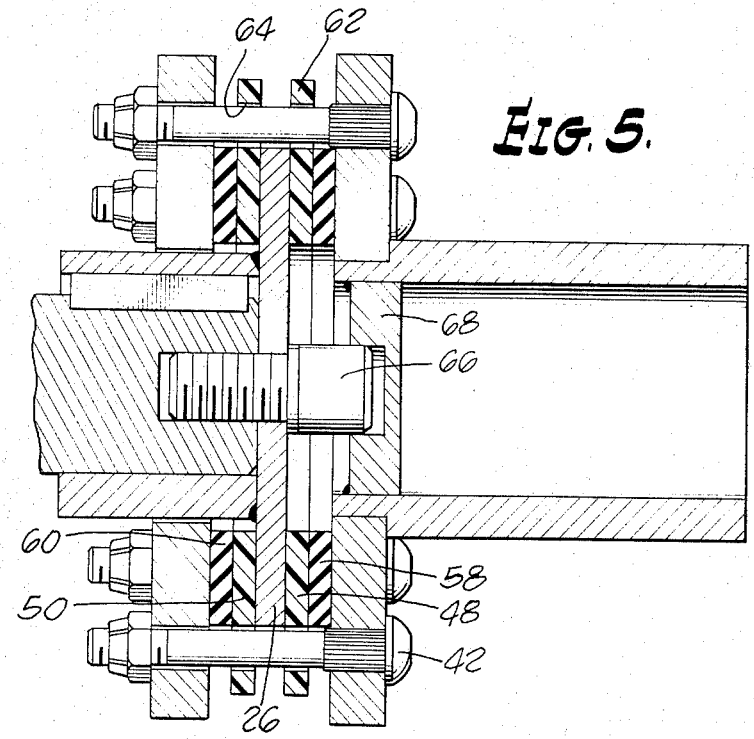
FIG. 5 is a cross-sectional view similar to FIG. 4 illustrating an alternate configuration.

The proper tension is obtained in the clutch by tightening the load bolts 42 uniformly to compress the phenolic friction disks 48 and 50 against the clutch plate 26. The degree of pressure to be applied to the drive plate will depend upon the amount of torque required to stall the engine or tend to overturn the earth boring unit 10. The compression must be such that the clutch will commence to slip before sufficient binding torque is created to overturn the earth boring unit 10. FIG. 5 illustrates another method of constraining the phenolic friction disks 48 and 50 to rotate with the clutch housing 18. Extensions 62 are provided on the phenolic friction disks 48 an 50. They extend into the ring of load bolts 42. Holes 64 are provided for the load bolts 42 which then act to both compress the clutch and constrain the phenolic friction disks 48 and 50 from rotating with the clutch plate 26. Again, the resilient disks 58 and 60 are provided behind the phenolic friction disks 48 and 50. Proper alignment of the input with the output portions may be achieved by the alternate method illustrated in FIG. 5. A cap bearing 66 is employed with a socket 68. The cap bearing is centered in the clutch plate 26 and is anchored thereto. The cap bearing 66 provides a positive alignment force to retain the driving and driven portions in proper relative position.

To adjust the clutch, the load bolts 42 are uniformly torqued to draw the backplate 44 toward the front plate 36. The clutch plate 26 is thus between the friction disks 48 and 50 and the resilient backing disks 58 and 60. Because of the compressive nature of the resilient backing disks 58 and 60, the loading through the bolts 42 will take place through a greater travel of the back plate 34 than would be necessary without disks 58 and 60. Consequently, any increase in the compression of the various disks will be less dependent upon any unit of motion of the load bolts 42 in the present invention.

Thus, a clutch is provided which acts to reduce the transmitted shock loads, reduces the effect of misalignment, and is easier to properly adjust.

Having fully described the invention in connection with the presently preferred embodiment together with modifications thereof, it is to be understood that our invention is not limited to said embodiment or modifications but rather is of the full scope of the appended claims.

We claim:

1. A slip clutch for a horizontal earth boring machine, said clutch comprising;
 a clutch plate,
 a compression means,
 two friction disks located within said compression means, said disks being in compressive contact with said clutch plate and being constrained to rotate with said compression means, and
 resilient backing for said friction disks between each said friction disk and said compression means.

2. The device of claim 1, wherein said compression means comprises;
 a front plate,
 a back plate, and
 means for tying said front plate to said back plate so as to compress said included friction disks, clutch plate and resilient backing therebetween.

3. A slip clutch for a horizontal earth boring machine, said clutch comprising;
 a clutch plate,
 a compression means,
 two friction disks located within said compression means, said disks being in compressive contact with said clutch plate and being constrained to rotate with said compression means,
 resilient backing for said friction disks, and
 pins extending into said compression means, through said resilient backing and into said friction disks to prevent relative rotation of said friction disks with respect to said compression means.

4. The device of claim 1, wherein said friction disks extend to engage said compression means to prevent relative rotation of said friction disks relative to said compression means.

5. The device of claim 1, wherein said slip clutch further comprises the means for physically maintaining alignment between said clutch plate and said compression means.

6. The device of claim 5, wherein said alignment means comprises a cap bearing fixed to said drive disk in a socket fixed to said compression means.

7. The device of claim 1, wherein said resilient backing is Neoprene.

8. A slip clutch comprising;
a front plate rigidly fixed to one side of the drive train, a back plate constrained to move with said front plate,
tying means to forcibly draw said back plate toward said front plate, and to prevent relative rotation of said back plate relative to said front plate,
two friction disks respectively attached to said front plate and said back plate,
resilient backing material positioned between each of said friction disks and said front plate and said back plate respectively, and
a metal disk located between said friction disks and attached to the other side of the drive train.

9. The device of claim 8, wherein said slip clutch further comprises a means for physically maintaining alignment between said front plate and said metal disk.

10. The device of claim 9, wherein said alignment means comprises a cap bearing rigidly fixed to one side of said drive train and a socket to receive said cap bearing;
said socket being rigidly fixed to the other side of the drive train.

11. The device of claim 8, wherein said backing material is Neoprene.

12. A slip clutch comprising;
a front plate rigidly fixed to one side of the drive train, a back plate constrained to move with said front plate,
tying means to forcibly draw said back plate toward said front plate, and to prevent relative rotation of said back plate relative to said front plate,
two friction disks respectively attached to said front plate and said back plate,
resilient backing material positioned between each of said friction disks and said front plate and said back plate respectively,
a metal disk located between said friction disks and attached to the other side of the drive train, and
pins extending into said friciton disks through said resilient backing material and into said front plate and said back plate respectively to prevent relative rotation of said friction disks with respect to said front plate and said back plate respectively.

13. The device of claim 8, wherein said friction disks extend about said tying means so as to prevent relative rotation between said tying means and said friction disks.

14. A slip clutch for a horizontal earth boring machine, said clutch comprising;
a clutch plate,
a compression means,
two friction disks located within said compression means, said disks being in compressive contact with said clutch plate,
resilient means located between said friction disks and said compression means for axially supporting said friction disks against said clutch plate, and
means for preventing shear loadings and friction surface forces on said resilient means.

15. The device of claim 14, wherein said compression means comprises:
a front plate,
a back plate, and
means for tying said front plate to said back plate so as to compress said included friction disks, clutch plate and resilient means therebetween.

16. A slip clutch for a horizontal earth boring machine, said clutch comprising;
a clutch plate,
a compression means, said compression means including a front plate, a back plate and means for tying said front plate to said back plate,
a first friction disk, said first friction disk being in contact with said clutch plate and being positioned between said clutch plate and said front plate,
a second friction disk, said second friction disk being in contact with said clutch plate and being positioned between said clutch plate and said back plate,
a first resilient disk, said first resilient disk being positioned between said first friction disk and said front plate,
a second resilient disk, said second resilient disk being positioned between said second friction disk and said back plate, and
means for preventing relative lateral movement between the front and back faces of each of said resilient disks.

17. The device of claim 16 wherein said means for preventing relative movement between the front and back faces of each of said resilient disks includes rigid links preventing relative rotational movement between said friction disks and said compression means.

* * * * *